United States Patent
Jain et al.

(10) Patent No.: US 9,628,359 B1
(45) Date of Patent: Apr. 18, 2017

(54) NETWORK SELECTION USING CURRENT AND HISTORICAL MEASUREMENTS

(71) Applicant: Google Inc., Mountain View, CA (US)

(72) Inventors: Arvind Jain, Los Altos, CA (US); Brian Clair Williammee, Mountain View, CA (US)

(73) Assignee: Google Inc., Mountain View, CA (US)

(*) Notice: Subject to any disclaimer, the term of this patent is extended or adjusted under 35 U.S.C. 154(b) by 474 days.

(21) Appl. No.: 14/139,325

(22) Filed: Dec. 23, 2013

(51) Int. Cl.
*G06F 15/16* (2006.01)
*H04L 12/26* (2006.01)

(52) U.S. Cl.
CPC ......... *H04L 43/0811* (2013.01); *H04L 43/16* (2013.01)

(58) Field of Classification Search
CPC ............................. H04L 43/0811; H04L 43/16
USPC ........................................................ 709/204
See application file for complete search history.

(56) References Cited

U.S. PATENT DOCUMENTS

| | | | |
|---|---|---|---|
| 6,128,490 A | 10/2000 | Shaheen et al. | |
| 6,633,761 B1 | 10/2003 | Singhal et al. | |
| 7,054,627 B1* | 5/2006 | Hillman | H04W 4/00 370/328 |
| 7,483,984 B1* | 1/2009 | Jonker | H04L 41/22 709/203 |
| 7,509,131 B2 | 3/2009 | Krumm et al. | |
| 7,848,292 B2 | 12/2010 | Bl et al. | |
| 8,126,476 B2* | 2/2012 | Vardi | H04W 72/02 455/422.1 |
| 8,131,317 B2 | 3/2012 | Lee | |
| 8,155,081 B1* | 4/2012 | Mater | H04W 4/04 370/254 |

(Continued)

FOREIGN PATENT DOCUMENTS

| | | |
|---|---|---|
| WO | 2013/020598 A1 | 2/2013 |
| WO | 2013/044359 A1 | 4/2013 |

OTHER PUBLICATIONS

Ge et al., "A History-Based Handover Prediction for LTE Systems" Computer Network and Multimedia Technology. CNMT. International Symposium on, vol., no., pp. 1,4, 18-20 (Jan. 2009).

(Continued)

*Primary Examiner* — Mohamed Wasel
*Assistant Examiner* — Binod J Kunwar
(74) *Attorney, Agent, or Firm* — Troutman Sanders LLP; James E. Schutz; Brennan M. Carmody

(57) ABSTRACT

A system and method for aiding selection of a data network based on access point location and historical performance parameters of the data network is provided. The system and method include a server receiving location information and network performance parameters from a plurality of client devices. The location information relates a location of an individual client device of the plurality of client devices, and the network performance parameters are measured from data networks available to the individual client device at the time of reporting its location information. Using the received location information and network performance parameters, the server determines a geographic location of an access point for each of the available data networks. Using the geographic location of the access point for each of the available data networks, the server then removes a subset of the performance parameters, and builds a database of summarized performance parameters based on the subset.

14 Claims, 10 Drawing Sheets

(56) References Cited

U.S. PATENT DOCUMENTS

| | | | |
|---|---|---|---|
| 8,165,581 B2 | 4/2012 | Joshi et al. | |
| 8,200,217 B2 | 6/2012 | Kanade et al. | |
| 8,369,264 B2 * | 2/2013 | Brachet | G01S 5/0236 340/572.4 |
| 8,433,334 B2 * | 4/2013 | Huang | G01S 5/02 342/357.4 |
| 8,477,645 B2 * | 7/2013 | Scherzer | H04W 48/14 370/230 |
| 8,542,637 B2 | 9/2013 | Bandhakavi et al. | |
| 8,565,766 B2 * | 10/2013 | Scherzer | H04W 48/18 455/432.3 |
| 8,787,171 B2 * | 7/2014 | Macnaughtan | G01S 5/0236 370/236 |
| 9,137,744 B2 * | 9/2015 | Scherzer | H04W 48/18 |
| 9,140,552 B2 * | 9/2015 | Pereira | G01C 21/00 |
| 9,154,984 B1 * | 10/2015 | Jain | H04W 24/10 |
| 2004/0259555 A1 * | 12/2004 | Rappaport | H04W 16/18 455/446 |
| 2005/0245269 A1 | 11/2005 | Demirhan et al. | |
| 2006/0095348 A1 * | 5/2006 | Jones | G01S 5/02 705/29 |
| 2006/0098625 A1 | 5/2006 | King et al. | |
| 2006/0193295 A1 | 8/2006 | White et al. | |
| 2006/0217131 A1 * | 9/2006 | Alizadeh-Shabdiz | G01S 5/02 455/456.1 |
| 2006/0240840 A1 * | 10/2006 | Morgan | G01S 5/02 455/456.1 |
| 2007/0004427 A1 * | 1/2007 | Morgan | G01S 5/02 455/456.1 |
| 2007/0037550 A1 | 2/2007 | Rassam | |
| 2007/0064684 A1 | 3/2007 | Kottilingal | |
| 2007/0064894 A1 | 3/2007 | Armstrong et al. | |
| 2007/0079376 A1 * | 4/2007 | Robert | H04L 63/1408 726/23 |
| 2007/0121560 A1 * | 5/2007 | Edge | H04W 64/00 370/338 |
| 2007/0127391 A1 | 6/2007 | Goodman | |
| 2007/0298720 A1 * | 12/2007 | Wolman | H04L 63/1408 455/66.1 |
| 2008/0002668 A1 | 1/2008 | Asokan et al. | |
| 2008/0176583 A1 * | 7/2008 | Brachet | G01S 5/0236 455/456.3 |
| 2008/0186882 A1 * | 8/2008 | Scherzer | H04W 88/02 370/310 |
| 2008/0233977 A1 | 9/2008 | Xu et al. | |
| 2009/0116443 A1 * | 5/2009 | Walker | H04W 36/30 370/329 |
| 2009/0168757 A1 | 7/2009 | Bush | |
| 2009/0227270 A1 * | 9/2009 | Naaman | H04W 4/025 455/456.6 |
| 2009/0312036 A1 * | 12/2009 | Alizadeh-Shabdiz | G01S 5/0263 455/456.1 |
| 2010/0172323 A1 | 7/2010 | Rexhepi et al. | |
| 2011/0096673 A1 | 4/2011 | Stevenson et al. | |
| 2011/0216694 A1 | 9/2011 | Plasberg et al. | |
| 2011/0269423 A1 | 11/2011 | Schell et al. | |
| 2011/0312312 A1 * | 12/2011 | Astrom | G01S 5/021 455/418 |
| 2012/0009890 A1 * | 1/2012 | Curcio | H04L 29/06 455/230 |
| 2012/0108206 A1 | 5/2012 | Haggerty | |
| 2012/0178488 A1 | 7/2012 | Jonker et al. | |
| 2012/0200457 A1 * | 8/2012 | Farrokhi | G01S 5/0036 342/357.29 |
| 2013/0165117 A1 | 6/2013 | Narayanan | |
| 2013/0225169 A1 | 8/2013 | Farnsworth et al. | |
| 2013/0227647 A1 | 8/2013 | Thomas et al. | |
| 2013/0230023 A1 | 9/2013 | Gray et al. | |
| 2013/0303156 A1 | 11/2013 | Astrom et al. | |
| 2014/0071895 A1 | 3/2014 | Bane et al. | |
| 2014/0080539 A1 | 3/2014 | Scherzer et al. | |
| 2014/0127992 A1 | 5/2014 | Kuscher et al. | |
| 2014/0148100 A1 | 5/2014 | Kim et al. | |
| 2014/0148170 A1 | 5/2014 | Damji et al. | |
| 2014/0211648 A1 | 7/2014 | Rahmati et al. | |
| 2014/0213256 A1 | 7/2014 | Meylan et al. | |

OTHER PUBLICATIONS

Gemalto N.V. "Card ADMIN," Document Reference D1225357A (Jun. 2, 2011).

Dicoda.com. "Multi IMSI," Dicoda.com (Jun. 20, 2013) (available at: https://web.archive.org/web/20130620191315/http://www.dicoda.com/introduction/imsi).

Higginbotham, Stacey. "Is Apple About to Cut Out the Carriers?" Gigaom.com (Oct. 27, 2010) (available at: http://gigaom.com/2010/10/27/is-apple-about-to-cut-out-the-carriers/).

Tobias, Marc Weber. "The Split Personality Cell Phone That Saves You Money on Overseas Calling," Forbes.com (Aug. 20, 2013) (available at: http://onforb.es/14gMCe4).

"Circuit-switched fallback. The first phase of voice evolution for mobile LTE devices." Qualcomm Incorporated, 2012 11 pages.

CMSG. "Reprogrammable SIMs: Technology, Evolution and Implications," Final Report (Sep. 25, 2012) (available at: http://stakeholders.ofcom.org.uk/binaries/research/telecoms-research/reprogrammable-sims.pdf).

"Feature Requests—Republic Wireless Wiki," http://republic-wireless.wikia.com/wiki/Feature_Requests 1 page.

"Republic Wireless," http://republicwireless.com 2 pages.

"T-Mobile's 4G Network—Check Your Coverage—T-Mobile Blazing Fast 4G Coverage" 9 pages.

"What is VoLTE | Voice Over LTE | Tutorial," *Radio-Electronics.com*, http://www.radio-electronics.com/info/cellulartelecomms/lte-long-term-evolution/voice-over-lte-volte.php 5 pages.

Korean Intellectual Property Office, International Search Report and the Written Opinion in International Application No. PCT/US2014/057709 Dec. 29, 2014.

* cited by examiner

NETWORK SELECTION USING CURRENT AND HISTORICAL MEASUREMENTS

BACKGROUND OF THE INVENTION

Mobile client devices, such as a mobile phone or laptop, often have a plurality of available wireless networks to choose from in order to achieve network connectivity. Typically, an available wireless network is selected by a client device or a user of the client device. However, the client device and the user do not have access to certain historical network performance parameters that will inform a decision to select a wireless data network to use for achieving the best network performance. Accordingly, the wireless data network selection process is inefficient.

BRIEF SUMMARY OF THE INVENTION

One embodiment provides a method for aiding selection of a data network based on access point location and historical performance parameters of the data network. The method includes receiving location information and network performance parameters from a plurality of client devices, the location information relates each individual client device of the plurality of client devices to a location of the individual client device when the individual client device detects available data networks, and the network performance parameters are collected, by the individual client device, from the available data networks; aggregating the location information of the plurality of client devices and the network performance parameters from the available data networks such that the location information received from the individual client device of the plurality of client devices is associated with corresponding network performance parameters from the available data networks; determining a geographic location of an access point for each of the available data networks based on the location information of the plurality of client devices; removing, for the access point for each of the available data networks, network performance parameters and location information for each of the available data networks; and building a database containing the geographic location of the access point for each of the available data networks and the network performance parameters associated therewith from network performance parameters remaining after removing the network performance parameters and the location information for each of the available data networks.

Another embodiment includes a system for aiding selection of a data network based on access point location and historical performance parameters of the data network. The system includes a plurality of client devices; a plurality of data networks, each individual data network of the plurality of data networks is associated with a key that uniquely identifies an access point of the individual data network; and a server communicatively coupled to the plurality of client devices. The server configured to receive location information, network performance parameters and the key from the plurality of client devices, the location information relates to a location of an individual client device when the individual client device detects available data networks of the plurality of data networks, and the network performance parameters are collected, by the individual client device, from the available data networks and the key is collected from the access point associated with the available data networks; aggregate received location information and network performance parameters from each of the plurality of client devices such that the aggregated location information and network performance parameters are organized based on the key; determine a geographic location of an access point for each data network of the plurality of data networks based on the received location information; remove, for each access point of the plurality of data networks, the received network performance parameters and the received location information for each data network of the plurality of data networks; and build a database of the geographic location of the access point for each data network of the plurality of data networks and network performance parameters remaining after removing the network performance parameters and the location information for each data network of the plurality of data networks.

Yet another embodiment includes a non-transitory computer readable storage device for aiding selection of a data network based on access point location and historical performance parameters of the data network. The non-transitory computer readable storage device having computer executable instructions for performing the steps of receiving location information and network performance parameters from a plurality of client devices, the location information relates each individual client device of the plurality of client devices to a location of the individual client device when the individual client device detects available data networks, and the network performance parameters are collected, by the individual client device, from the available data networks; aggregating the location information of the plurality of client devices and the network performance parameters from the available data networks such that the location information received from the individual client device of the plurality of client devices is associated with corresponding network performance parameters from the available data networks; determining a geographic location of an access point for each of the available data networks based on the location information of the plurality of client devices; removing, for the access point for each of the available data networks, network performance parameters and location information for each of the available data networks; and building a database containing the geographic location of the access point for each of the available data networks and the network performance parameters associated therewith from network performance parameters remaining after removing the network performance parameters and the location information for each of the available data networks.

DETAILED DESCRIPTION OF THE INVENTION

Mobile client devices, such as a mobile phone or laptop, often have a plurality of available wireless networks to choose from in order to achieve network connectivity. Typically, an available wireless network is selected by a client device or a user of the client device. However, the client device and the user do not have access to certain historical network performance parameters that will inform a decision to select a wireless data network to use for achieving the best network performance. Accordingly, the wireless data network selection process is inefficient.

Therefore, to improve data network selection efficiency, historical performance parameters as well as current performance parameters can be used when connecting to a wireless network. Embodiments of the disclosure described herein provide a system to collect and analyze long term performance parameters for wireless networks. Using the collected performance parameters, the system is able to build a database of summarized historical performance parameters for each geographic location the system is monitoring. The system is then able to provide access to the database in order to inform a client device's decision regarding wireless network selection.

Figure 1:
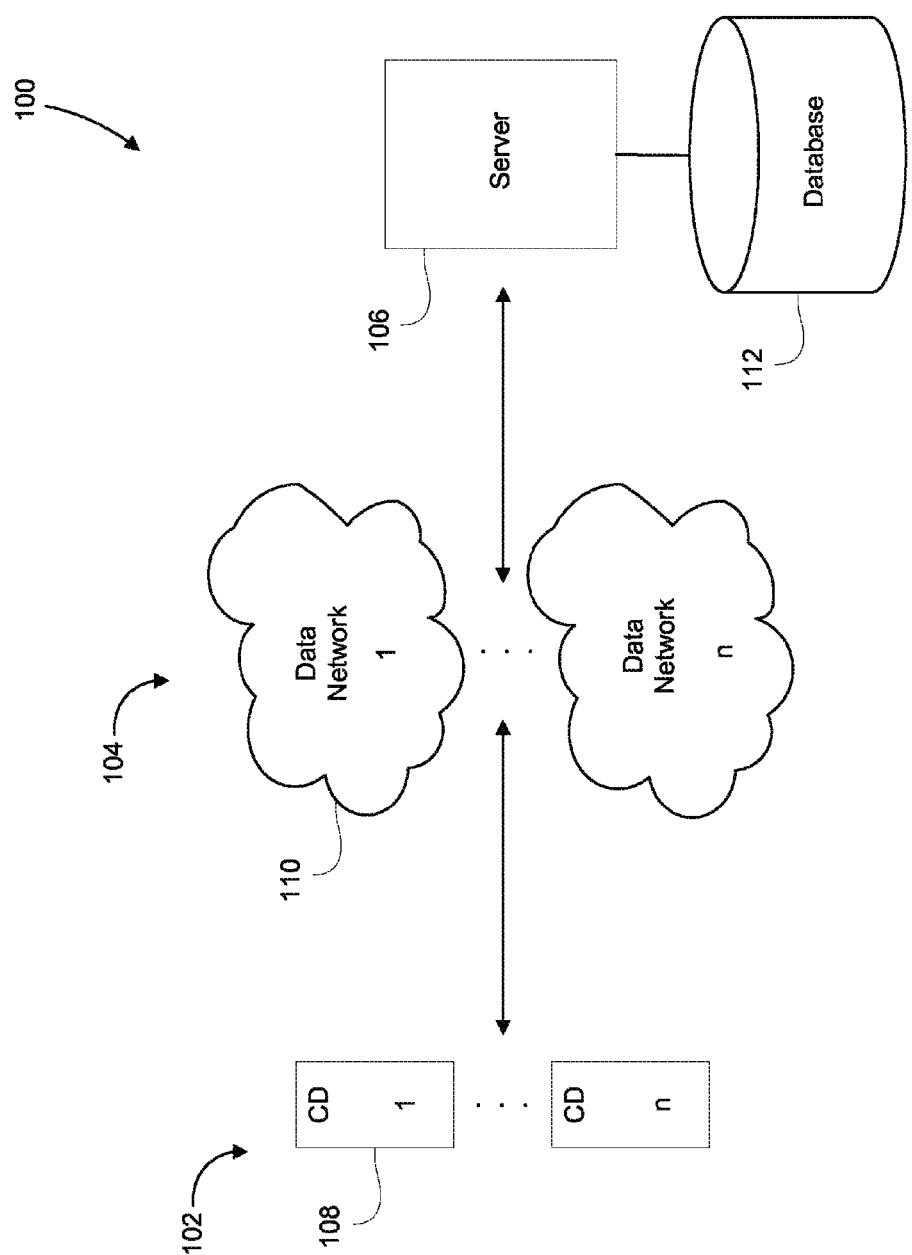
FIG. 1 is a block diagram illustrating a system for network selection, according to an example embodiment.

FIG. 1 illustrates a block diagram of an example communications system 100 in which various embodiments of the present disclosure may be implemented. In the communications system 100 depicted in FIG. 1, a plurality of client devices 1-n 102 are shown in relation to a plurality of data networks 1-n 104, which in turn is shown in relation to a server 106. The plurality of client devices 102 collect performance parameters from the plurality of data networks 104, which the plurality of client devices 102 has available while they travel around various locations. The performance parameters collected by the plurality of client devices 102 are then transferred to the server 106, which analyzes the performance parameters to build a database 112 of summarized performance parameters in each geographic location. The server 106 then shares this database 112 with each individual client device, such as client device 108, comprising the plurality of client devices 102. The plurality of client devices 102 can then make an informed decision on which data network of the plurality of data networks 104 to connect.

The plurality of client devices 102 may be a mobile device such as a smart phone, a tablet computer, a laptop computer, a watch with a computer operating system, a personal digital assistant (PDA), a video game console, a wearable or embedded digital device(s), or any one of a number of additional devices capable of communicating over the plurality of data networks 104.

The plurality of data networks 104 include but are not limited to Wide Area Networks (WAN) such as a Long Term Evolution (LTE) network, a Global System for Mobile Communications (GSM) network, a Code Division Multiple Access (CDMA) network, Wireless Local Area Networks (WLAN) such as the various IEEE 802.11 standards, or any other kind of data network. The plurality of data networks 104 allow the plurality of client devices 102 to communicate with the server 106. For example, client device 108 may transmit information to the server 106 and receive information from the server 106 through data network 110. Further, the plurality of data networks 104 may include a set of cell towers, as well as a set of base stations and/or mobile switching centers (MSCs). In some embodiments, the plurality of data networks 104 may include various cell tower/base station/MSC arrangements.

As an aside, whether because of technological limitations or geographic limitations, not every client device of the plurality of client devices 102 will be able to connect to each of the plurality of data networks 104. In this manner, each individual client device from the plurality of client devices 102 will only report performance parameters from the individual data networks the individual client device is able to communicate with. For ease of description, embodiments of the disclosure described herein will refer to the plurality of client devices 102 collecting performance parameters from the plurality of data networks 104 even though it is understood that not every client device of the plurality of client devices 102 will communicate with every data network.

Further, server 106 is illustrated as a single server. However, server 106 could be implemented as a plurality of servers servicing specified geographic locations, or server 106 could be implemented as a cloud server. The singular server 106 is illustrated for ease of description. This singular server illustration is not intended to limit the disclosure contained herein.

Figure 2:
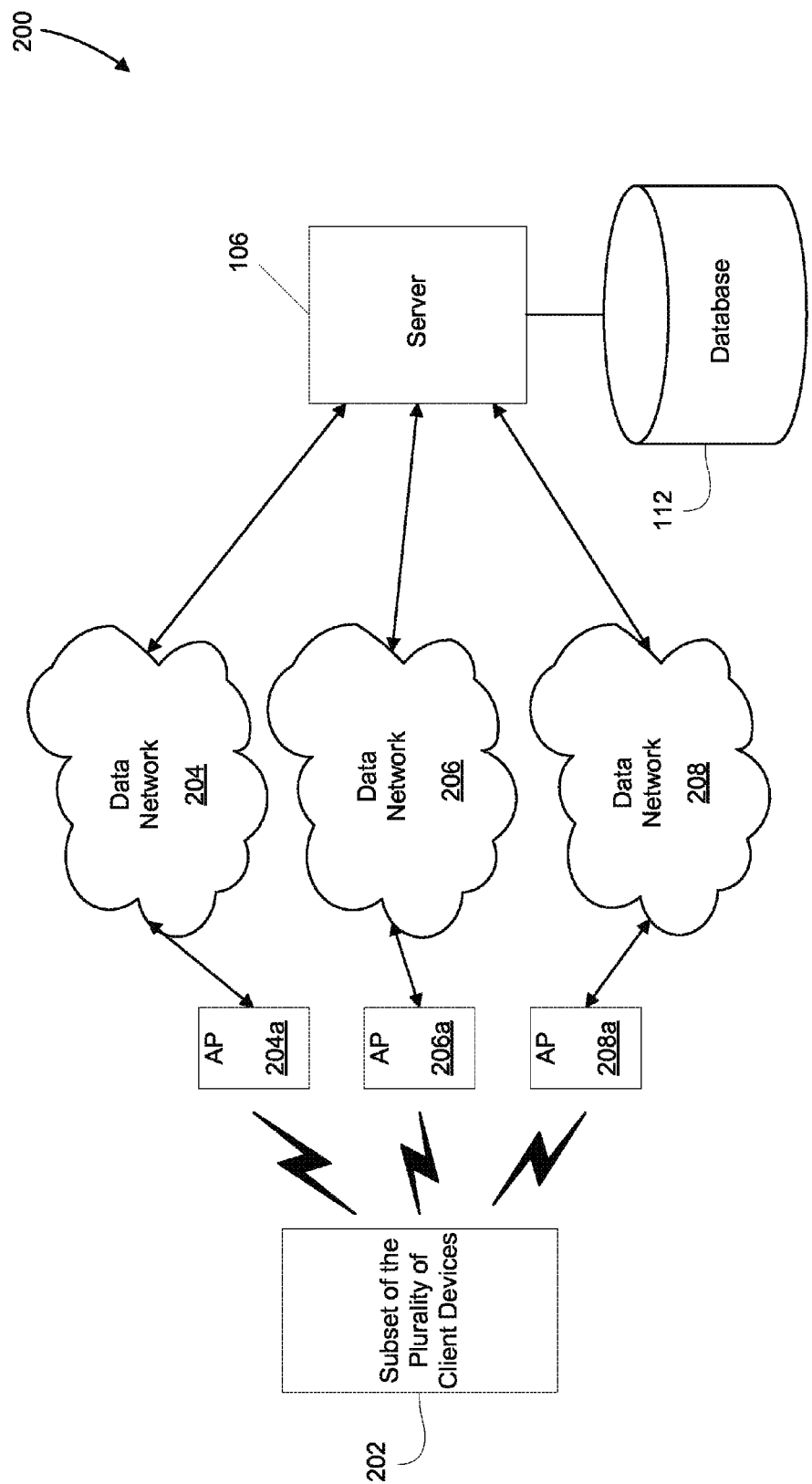
FIG. 2 is a block diagram illustrating an example embodiment of the system illustrated in FIG. 1.

FIG. 2 illustrates an example embodiment of the system illustrated in FIG. 1. In the example embodiment, system 200 is illustrated, which shows a wireless environment for a specific static location. In FIG. 2, a subset of the plurality of client devices 102 from FIG. 1 is illustrated as client devices 202, which, for ease of description, are each capable of connecting to a first data network 204, a second data network 206 and a third data network 208 through respective access points 204a, 206a and 208a. The client devices 202 are not all connected to the wireless networks 204, 206 and 208 at the same time. Rather, client devices 202 represent an ongoing collection of client devices that access the data networks 204, 206 and 208 over time.

In this manner, when the client devices 202 come in communication with data networks 204, 206 and 208 the client devices 202 will collect performance parameters. The performance parameters collected include, but are not limited to various combinations of: signal strength, application throughput, latency, packet errors, packet loss rate, and other data network quality metrics. The client devices 202 will report the performance parameters along with a location of the client devices 202 when the data was collected. Further, client devices 202 do not have to formally connect to the data network 204, 206 or 208 in order to collect performance parameters. For instance, a signal strength measurement may be gathered from any available network without first connecting to a network.

In certain embodiments of the disclosure, the client devices 202 receive location information from a data network such as a Global Positioning System (GPS) (not illustrated). In this embodiment, the client devices 202 receive its location from the GPS network in terms of GPS coordinates, which can be uploaded to the server 106 along with the performance parameters.

In other embodiments, where the client devices 202 are unable to communicate with the GPS network, or the GPS functionality on the client devices 202 is turned off, the client devices 202 attempt to ascertain their location based on its connection to data networks 204, 206 and 208. For example, the client devices 202 can triangulate their position based on a measured signal strength received from at least two data networks. Additionally, in certain embodiments, an estimation of location can be made based on a measured signal strength from a single data network. In these embodiments, a single data network access point with a known location pins the client device's location down to a range around the access point.

In addition to location information and performance parameters, the client devices 202 will report a unique identifier of each access point 204a, 206a and 208a for each data network 204, 206 and 208, respectively. The unique identifier represents a key, which uniquely describes each access point 204a, 206a and 208a for each data network 204, 206 and 208, respectively, and when combined with the performance parameters and location information allows the server 106 to organize the collected data based on the key such that the correct performance parameters and location information can be associated with the access point 204a, 206a and 208a from which it was collected. For example, for Wi-Fi networks, a key could be the Service Set Identification (SSID) and the Basic Service Set Identification (BSSID), which uniquely describe an access point for a Wi-Fi network. Therefore, for a particular Wi-Fi network, the client devices 202 would report some combination of the previously mentioned performance parameters, location information, and the SSID/BSSID for the access point of the Wi-Fi network to the server 106. The server 106 would then compile historical performance parameters and location information for the associated SSID/BSSID. This data collection and organization process could be utilized for each access point 204a, 206a and 208a of the data networks 204, 206 and 208 using any identifier as a key, as long as that identifier uniquely represents that specific access point of the specific data network.

As a plurality of data points are collected from the client devices 202 over time, the server 106 will aggregate the data based on the associated key and apply various heuristics in order to determine the historical performance of the data networks 204, 206 and 208. In doing this, the server 106 analyzes the performance parameters and the location data to determine a geographic location of the access points 204a, 206a and 208a. A geographic location of the access points 204a, 206a and 208a is determined by analyzing the performance parameters related to signal strength or application throughput, which are strongly correlated to the client devices' 202 distance from the access point 204a, 206a and 208a. For example, the server 106 may only look at the top 10% reported signal strengths and take a geometric average of the reported location for each of those samples or calculate a centroid position of the reported locations for each of the samples. In this manner, an accurate location of access points 204a, 206a and 208a can be determined.

Once the geographic location of the access point 204a, 206a and 208a is determined, performance parameters collected from client devices considered too far from that location are removed from the data such that only performance parameters collected from client devices within a specific distance of the access point 204a, 206a and 208a remain. In this regard, the remaining performance parameters relating to signal strength, latency and throughput are utilized by the server 106 to build a database 112 of summarized performance parameters for each of the available networks, which in FIG. 2 are data networks 204, 206 and 208.

In certain embodiments, a threshold value of distance is utilized to determine what performance parameters are considered too far from the access point 204a, 206a or 208a. This threshold distance value will generally be predetermined; however, if the performance parameters are indicating particularly good or bad performance for the data network 204, 206 or 208, then the threshold value can be increased or decreased accordingly. Further, another method of adjusting the threshold distance value would be to determine whether the current threshold distance value was capturing enough data points to be a statistically relevant representation of the historical performance of the specific data network. If the server 106 determines that not enough data points are present, then the threshold distance would be increased to capture more data. If enough data is captured, then the server 106 may maintain the threshold distance or even decrease it if too much data is being captured such that it is overloading the system.

In certain embodiments, performance parameters collected from client devices with poor signal quality are removed as opposed to performance paremters from client devices considered too far from the access point 204a, 206a and 108a. In this manner, only performance parameters from client devices reporting good signal strength will be utilized. Additionally, in this embodiment, the threshold for determining what performance parameters to keep or discard would be based on a threshold of signal strength instead of distance. Similar to other embodiments, a method of adjusting the threshold of signal stength value would be to determine whether the current threshold of signal strength value was capturing enough data points to be a statistically relevant representation of the historical performance of the specific data network. If the server 106 determines that not enough data points are present, then the threshold of signal strength would be decreased to capture more data. If enough data is captured, then the server 106 may maintain the threshold signal strength or even increase it if too much data is being captured such that it is overloading the system. Also, the performance parameters are collected continuously over time. Therefore, time of collection can be weighted in developing the database 112 as well. For instance, more recently collected data can receive more weight when determining the summarized performance parameters of the data networks 204, 206 and 208.

Accordingly, after the initial database 112 of summarized performance parameters for each network 204, 206 and 208 is built, the server 106 is able to supply the client devices 202 with a summarized list of performance parameters for available networks 204, 206 and 208 based on the database 112. In certain embodiments, the summarized list of performance parameters will be sent to the client devices 202 upon request from the client devices 202. For instance, the client devices 202 may request the data by sending a request and an associated key for the particular data network 204, 206 or 208, which the server 106 responds to by sending the data. In other embodiments, the summarized list of performance parameters for networks 204, 206 and 208 could be stored prior to the need to connect to data networks 204, 206 or 208. However, in this system, the geographic location would have to be predefined because the global list of data networks would potentially be too large. The geographic location could be determined based on the client devices' 202 individual zip code or city.

Once the client devices 202 have access to the summarized performance parameters for the data networks 204, 206 and 208, then the client devices 202 can proceed to actually select a data network 204, 206 or 208 to which to connect.

In certain embodiments, the client devices 202 decision will be based on a user's preference (such as a preference for Wi-Fi networks as opposed to cellular carrier networks), current signal strength of the data network 204, 206 and 208, a client devices 202 location relative to the access points 204a, 206a and 208a, and the summarized performance parameters. Additionally, in certain embodiments, the client devices 202 will undertake performance probes of the data networks 204, 206 and 208 in order to determine an instantaneous latency and throughput measurement, and use this instantaneous data in combination with the user preference and summarized performance parameters to select a data network, such as data networks 204, 206 and 208.

Furthermore, in certain embodiments, the server 106 may analyze the available networks based on current and historical performance parameters. In this manner, client device 202 could send server 106 network keys associated with every available network along with available signal strengths and associated noise for each available network. The server 106 would then analyze the instantaneous signal strength and noise along with the historical performance parameters in order to determine an estimated performance. For example, a client device could report data networks 204, 206 and 208 are available, and data network 204 provides a signal strength of 100 dBm with 10 dBm of noise, data network 206 provides a signal strength of 90 dBm with 12 dBm of noise, and data network 208 provides a signal strength of 10 dBm with 40 dBm of noise. Utilizing these measurements coupled with historical performance parameters, from database 112, for data networks 204, 206 and 208 may return an expected performance signal strength of 80 dBm for data network 204, 85 dBm for data network 206, and 20 dBm for data network 208. In this example, data network 206 provides a higher expected performance than data network 204 even though data network 204 reported a stronger signal strength with less noise. The difference in expected performance is based on historical performance of data networks 204 and 206.

Figure 3:
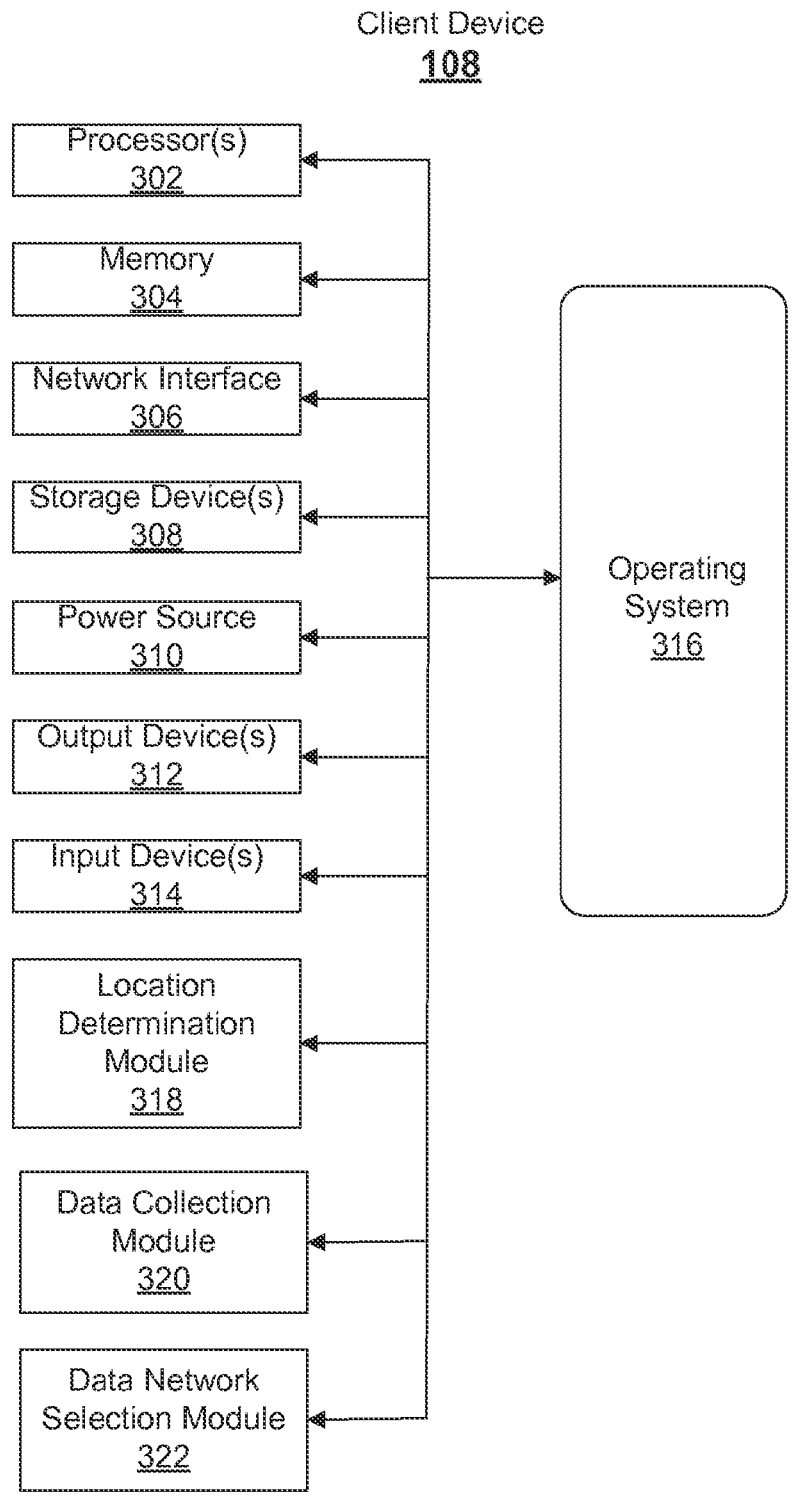
FIG. 3 is a block diagram illustrating components of a client device from the system illustrated in FIG. 1, according to an example embodiment.

Turning now to FIG. 3, a block diagram of basic functional components for an individual client device, such as client device 108 (see FIG. 1), of the plurality of client devices 102 (see FIG. 1), according to one aspect of the disclosure, is illustrated. In general, many other embodiments of the client device 108 may be used. In the illustrated embodiment of FIG. 3, the client device 108 includes one or more processors 302, memory 304, a network interface 306, one or more storage devices 308, power source 310, one or more output devices 312, one or more input devices 314, and a location determination module 318. The client device 108 also includes an operating system 316. Each of the components including the processor 302, memory 304, network interface 306, storage device 308, power source 310, output device 312, input device 314, location determination module 318, and the operating system 316 is interconnected physically, communicatively, and/or operatively for inter-component communications.

As illustrated, processor 302 is configured to implement functionality and/or process instructions for execution within client device 108. For example, processor 302 executes instructions stored in memory 304 or instructions stored on a storage device 308. Memory 304, which may be a non-transient, computer-readable storage medium, is configured to store information within client device 108 during operation. In some embodiments, memory 304 includes a temporary memory, an area for information not to be maintained when the client device 108 is turned off. Examples of such temporary memory include volatile memories such as random access memories (RAM), dynamic random access memories (DRAM), and static random access memories (SRAM). Memory 304 also maintains program instructions for execution by the processor 302.

Storage device 308 also includes one or more non-transient computer-readable storage media. The storage device 308 is generally configured to store larger amounts of information than memory 304. The storage device 308 may further be configured for long-term storage of information. In some examples, the storage device 308 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 108 uses network interface 306 to communicate with external devices via one or more networks, such as the data networks 204, 206 and 208 (see FIG. 2), one or more wireless networks, and other types of networks through which a communication with the client device 108 may be established. Network interface 306 may be a network interface card, such as an Ethernet card, an optical transceiver, a radio frequency transceiver, or any other type of device that can send and receive information. Other non-limiting examples of network interfaces include Bluetooth®, 3G and Wi-Fi radios in client computing devices, and USB.

The client device 108 includes one or more input devices 314. Input devices 314 are configured to receive input from a user or a surrounding environment of the user through tactile, audio, and/or video feedback. Non-limiting examples of input device 314 include a presence-sensitive screen, a mouse, a keyboard, a voice responsive system, video camera, microphone or any other type of input device. In some examples, a presence-sensitive screen includes a touch-sensitive screen.

One or more output devices 312 are also included in client device 108. Output devices 312 are configured to provide output to a user using tactile, audio, and/or video stimuli. Output device 312 may include a display screen (part of the presence-sensitive screen), a sound card, a video graphics adapter card, or any other type of device for converting a signal into an appropriate form understandable to humans or machines. Additional examples of output device 312 include a speaker such as headphones, a cathode ray tube (CRT) monitor, a liquid crystal display (LCD), or any other type of device that can generate intelligible output to a user.

The client device 108 includes one or more power sources 310 to provide power to the device. Non-limiting examples of power source 310 include single-use power sources, rechargeable power sources, and/or power sources developed from nickel-cadmium, lithium-ion, or other suitable material.

The client device 108 includes an operating system 316. The operating system 316 controls operations of the components of the client device 108. For example, the operating system 316 facilitates the interaction of the processor(s) 302, memory 304, network interface 306, storage device(s) 308, input device 314, output device 312, and power source 310.

The client device 108 uses the location determination module 318 to determine a geographic location of the client device 108. This location determination module 318 can be a GPS transceiver or a state of the processor 302, which is defined by a series of instructions stored on the memory 304 or storage device 308 that when executed cause the processor 302 to triangulate a geographic location of the client device 108 based on any available data network connections.

In certain embodiments of the disclosure, the client device 108 further includes a data collection module 320 and a data network selection module 322. In certain embodiments, both the data collection module 320 and the data network selection module 322 represent various states of the processor 302, and are defined by program instructions and/or data stored on the memory 304 or the storage device 308.

The data collection module 320 configures the client device 108 to collect performance parameters from the plurality of networks 104 (see FIG. 1). Once the performance parameters are collected for an individual data network, such as data network 110 (see FIG. 1), then the data collection module 320 configures the client device 108 to upload, to the server 106 (see FIGS. 1 and 2), the key associated with the data network 110, location information pertaining to a location of the client device 108 when the performance parameters were collected, and the actual performance parameters collected.

The data network selection module 322 configures the client device 108 (see FIG. 1) to request the summarized performance parameters by submitting a request to server 106 along with an associated key for each available data network, such as data networks 204, 206 and 208 (see FIG. 2). Once the summarized performance parameters are received from the server 106, the data network selection module 322 proceeds to select a data network, such as data network 204, 206 or 208, to connect.

Figure 4:
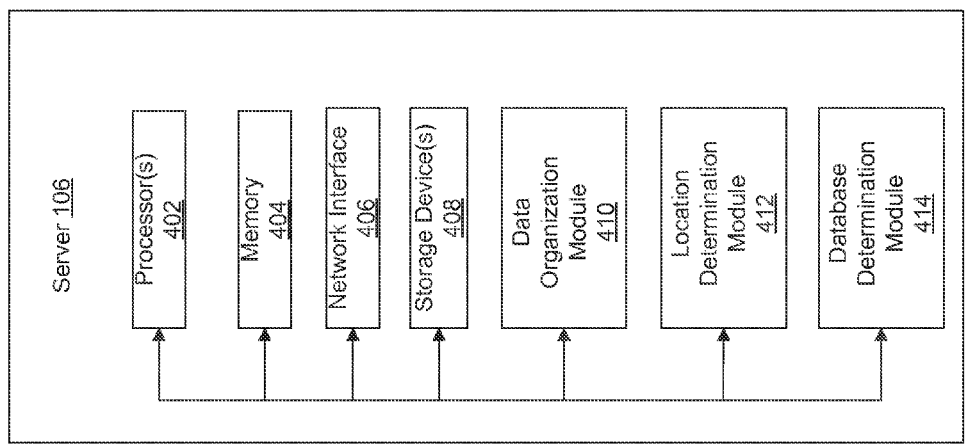
FIG. 4 is a block diagram illustrating components for a server from the system illustrated in FIG. 1, according to an example embodiment.

Moving to FIG. 4, a block diagram of basic functional components for a server 106 (see FIGS. 1 and 2) is depicted, according to one aspect of the disclosure. Specifically, server 106 is configured to receive performance parameters for the plurality of data networks 104 (see FIG. 1) and create a data base of summarized performance parameters arranged by keys that uniquely identify individual access points corresponding to individual data networks of the plurality of data networks 104.

The server 106 includes one or more processors 402, memory 404, network interface 406, one or more storage devices 408, a data organization module 410, a location determination module 412, and a database determination module 414. In some embodiments, each of the components including the processor(s) 402, memory 404, network interface 406, storage device 408, data organization module 410, location determination module 412, and database determination module 414 are interconnected physically, communicatively, and/or operatively for inter-component communications.

As illustrated, processors 402 are configured to implement functionality and/or process instructions for execution within server 106. For example, processors 402 execute instructions stored in memory 404 or instructions stored on storage devices 408. Memory 404, which may be a non-transitory, computer-readable storage medium, is configured to store information within server 106 during operation. In some embodiments, memory 404 includes a temporary memory, i.e. an area for information not to be maintained when the server 106 is turned off Examples of such temporary memory include volatile memories such as random access memories (RAM), dynamic random access memories (DRAM), and static random access memories (SRAM). Memory 404 also maintains program instructions for execution by the processors 402.

Storage devices 408 also include one or more non-transient computer-readable storage media. Storage devices 408 are generally configured to store larger amounts of information than memory 404. Storage devices 408 may further be configured for long-term storage of information. In some examples, storage devices 408 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The server 106 uses network interface 406 to communicate with external devices via one or more networks, such as the data networks 204, 206 and 208 of FIG. 2. Such networks may include one or more wireless networks, wired networks, fiber optics networks, and other types of networks through which communication between the server 106 and an external device may be established. Network interface 406 may be a network interface card, such as an Ethernet card, an optical transceiver, a radio frequency transceiver, or any other type of device that can send and receive information.

In certain embodiments of the disclosure, the server 106 further includes the data organization module 410, the location determination module 412, and the database determination module 414. In certain embodiments, the data collection module 410, the location determination module 412, and the database determination module 414 represent various states of the processor 402, and are defined by program instructions and/or data stored on the memory 404 or the storage device 408.

The data organization module 410 configures the server 106 to organize the performance parameters from the plurality of networks 104 (see FIG. 1) and sent by the plurality of client devices 102. As discussed above, the plurality of client devices 102 upload, to the server 106 (see FIGS. 1 and 2), the key associated with the plurality of data networks 104, location information pertaining to a location of each individual client device (of the plurality of client devices 102) such as client device 108 when the performance parameters were collected, and the actual performance parameters collected. Because this is an ongoing process, the data organization module 410 of the server 106 is configured to recognize new performance parameters as they are received and categorize it as pertaining to a specific access point, such as access points 204a, 206a and 208a of specific data networks, such as data networks 204, 206 and 208 based on the associated key, which uniquely identifies an access point. At this point, the data organization module 410 has a compiled list of performance parameters organized by key.

The location determination module 412 configures the server 106 (see FIG. 1) to determine a geographic location of the access point associated with a data network, such as access points 204a, 206a and 208a (see FIG. 2). As discussed above, the performance parameters sent from the plurality of client devices 102 also include location information for the plurality of client devices 102 when the performance parameters were acquired. The location determination module 412 selects a particular access point of a data network based on the key and reviews the performance parameters pertaining to signal strength. The location determination module 412 will select a subset of the data based on a selection criteria, such as selecting the top 10% of signal strength data. The location determination module 412 then determines a geometric average or centroid position of the location of the plurality of client devices 102 that reported the subset of data. The location determination module 412 then assigns the geometric average or centroid position as the geographic location of the access point, such as access point 204a, 206a and 208a.

As an aside, the selection criteria discussed above, the top 10% is only illustrative in that any selection criteria could be utilized. Other such criteria would be setting an actual threshold of signal strength, as opposed to a percentage. Also, the percentage could be other than the top 10%, such as the top 5% or top 25%, or greater. The percentage could also represent a band, such as the signal strengths falling between the top 5% and 25%. The selection criteria also do not have to review signal strength. For instance, the selection criteria could be a network throughput, or any other criteria indicative of a client device's location to an access point.

The database determination module 414 configures the server 106 to filter performance parameters received from a client device, such as client device 108 considered too far from the access point, such as access point 204a, 206a or 208a or reporting a poor signal strength. As previously discussed, a threshold of distance or threshold of signal strength is set such that performance parameters from client devices outside of the distance threshold or below the threshold signal strength are removed from the performance parameters associated with a particular key. Based on the remaining data, the database determination module 414 builds a database entry containing the summarized performance parameters for an access point, such as access points 204a, 206a or 208a organized by key. In this regard, a client device, such as client device 108 (see FIG. 1) can request the summarized performance parameters or an expected network performance by submitting a request to server 106 along with an associated key for the access point of each available data network, such as data networks 204, 206 and 208 (see FIG. 2).

Figure 5:
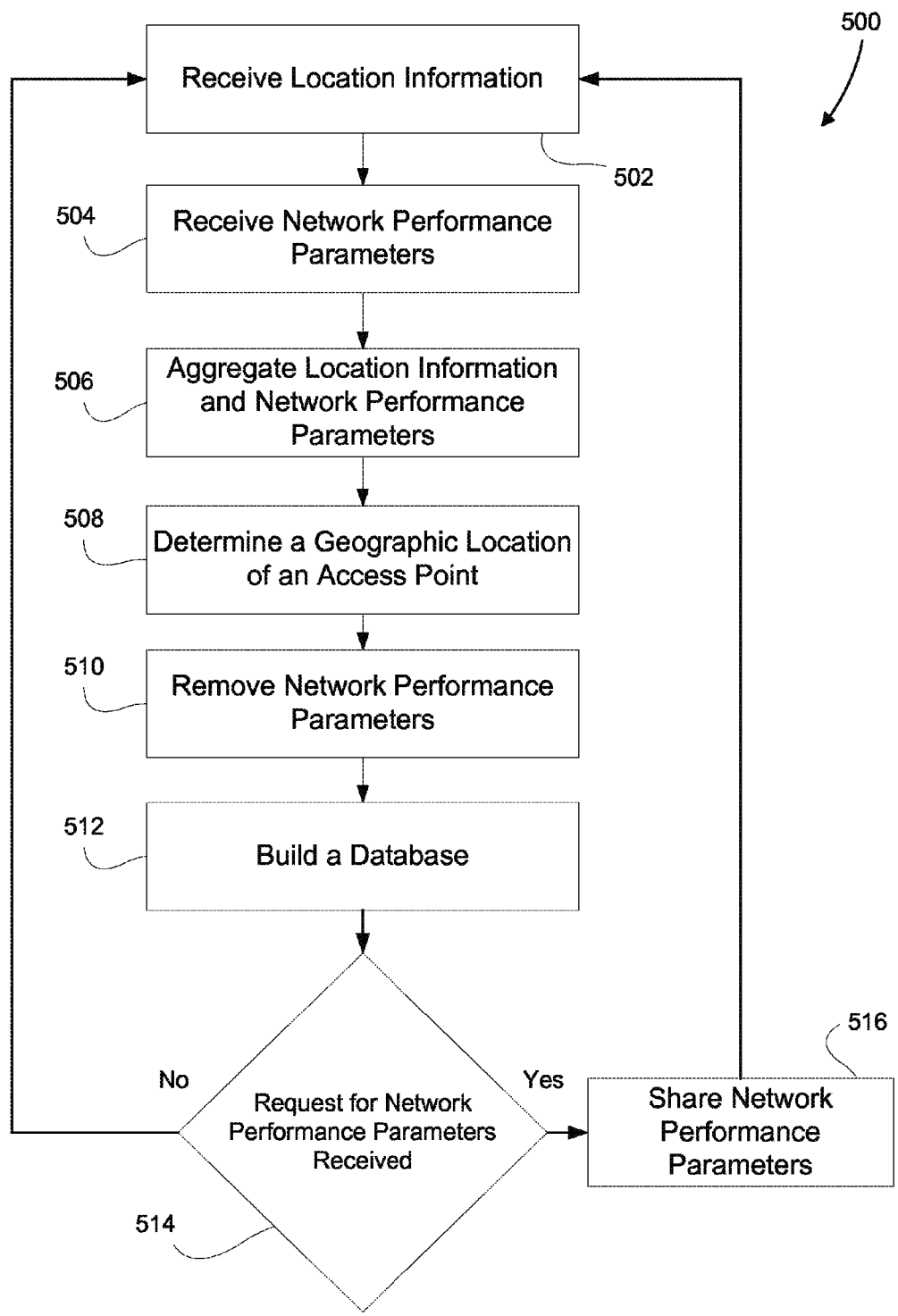
FIG. 5 is a flow diagram for building a database of network performance parameters, according to an example embodiment.

FIGS. 5-8 illustrate flow diagrams detailing various embodiments of the method and system for improved network selection. FIG. 5 illustrates a flow diagram for building and sharing a database 112 (see FIG. 1) of network performance parameters reported for various access points of data networks. At step 502, the server 106 (see FIG. 1) receives location information from the plurality of client devices 102. As discussed earlier, the location data is not received all at once. Rather, each individual client device, such as client device 108, reports its geographic location at the same time as it reports network performance parameters for available data networks, such as data network 110.

At step 504, the server 106 (see FIG. 1) receives network performance parameters regarding the plurality of data networks 104. The network performance parameters are received from the plurality of client devices 102. Once again, the network performance parameters are not received all at once. Rather, each individual client device, such as client device 108, reports its location at the same time as it reports its location, as discussed regarding step 502. Additionally, the plurality of client devices 102 transmit the key for the particular access point through which the individual client device, such as client device 108, accesses the individual data network, such as data network 110. As an aside, steps 502 and 504 can be performed simultaneously.

At step 506, the server 106 (see FIG. 1) aggregates the received location data and received network performance parameters based on the received key. In this regard, the server 106 is able to build a list of received performance parameters and location data categorized by received key, or in other words categorized by a particular access point for a particular data network, such as access point 204a for data network 204 (see FIG. 2).

Once the list of received performance parameters and location data is determined, at step 508, the server 106 (see FIG. 1) determines a geographic location of the access point of the data network the received data pertains to. The server 106 can use a variety of techniques to determine the geographic location of the access point. In general, the server 106 takes a subset of the data, such as the top 10% of signal strength data and determines the geographic location of the access point by calculating a geometric average or centroid position of location information received from the client devices that reported the top 10% of signal strength data. The server 106 then assigns the result of the geometric average or centroid position as the geographic location of the access point for the data network.

At step 510, the server 106 removes performance parameters received from client devices. In a particular embodiment, the server 106 removes performance parameters received from client devices considered too far from the assigned geographic location of the access point of the data network. Typically, this is done by determining a distance between the reported location of the client device and the assigned geographic location of the access point. The server 106 (see FIG. 1) then compares the determined distance to a threshold of distance, and any determined distances outside of the threshold are filtered from the list determined at step 506.

In another embodiment, performance parameters collected from client devices with poor signal quality are removed as opposed to performance paremters from client devices considered too far from the assigned geographic location of the access point of the data network. In this manner, only performance parameters from client devices reporting good signal strength will be utilized.

At step 512, the server 106 (see FIG. 1) builds a database 112 using the remaining performance parameters and assigned geographic location of access point data for each access point of each data network of the plurality of data networks 104. In certain embodiments, the database entries will be organized by key and contain data pertaining to summarized performance parameter measurements. The summarized performance parameter measurements could contain entries for any measurement network quality parameter, such as signal strength, application throughput, network latency, and packet data loss.

At step 514, the server 106 (see FIG. 1) checks to see if a request for data from the built database 112 is received. This request comes from a client device, such as client device 108. If no request is received, then the server 106 proceeds back to step 502, and the processes of building the database 112 restarts so to achieve as up to date of a database 112 as possible. And if a request from a client device, such as client device 108, is received, then the server 106 shares the relevant performance parameters from the database 112 with the client device 108 at step 516. After, the server 106 shares the data at step 516 it will continue to receive data at step 502 in order to achieve as up to date of a database 112 as possible.

Figure 6:
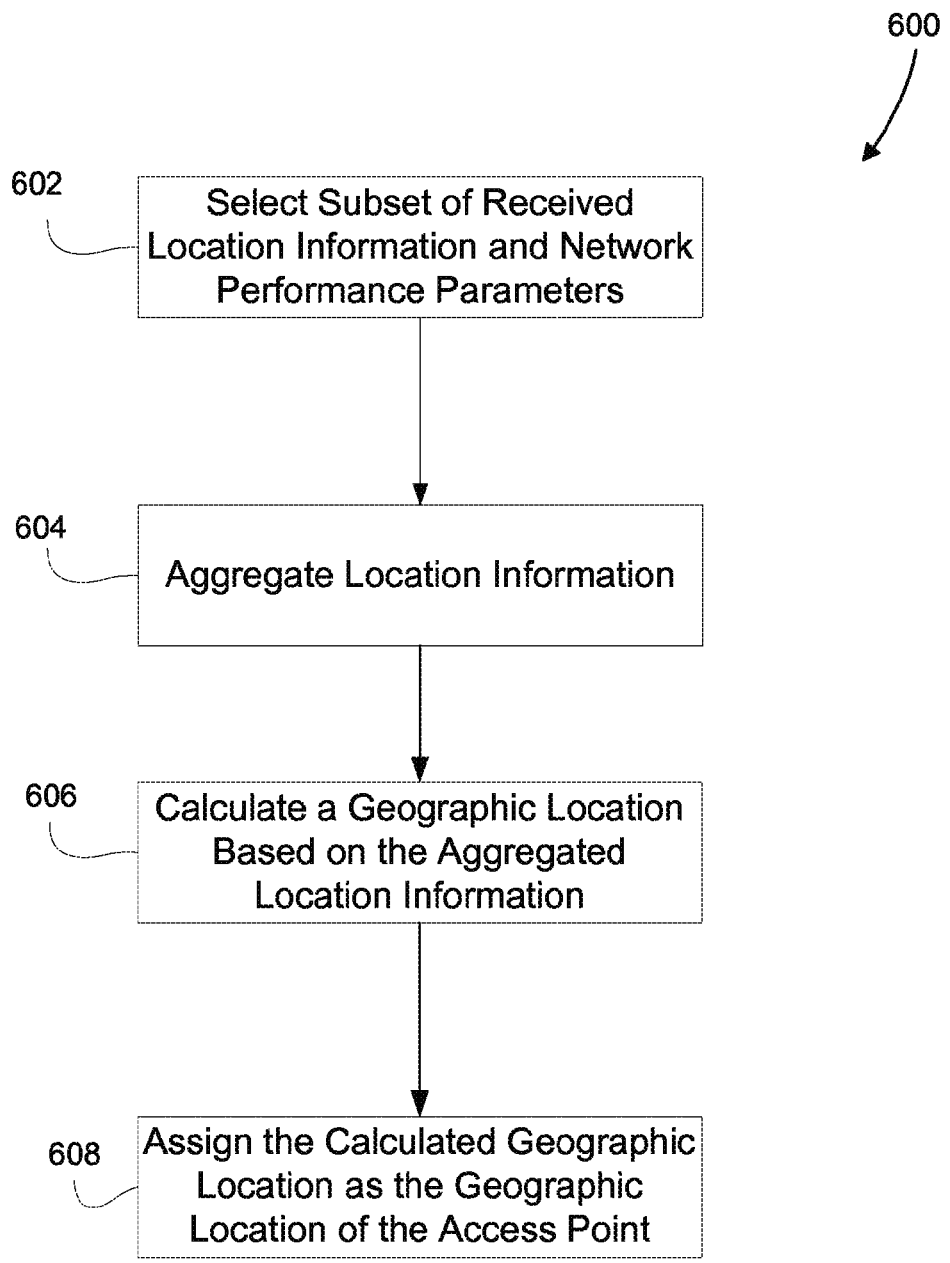
FIG. 6 is a flow diagram for determining a geographic location of an access point of a data network, according to an example embodiment.

FIG. 6 illustrates with more detail the process of determining a geographic location of an access point, as discussed in step 508 from FIG. 5. At step 602, the server 106 (see FIG. 1) selects a subset of the received location data (see step 502 in FIG. 5) based on the received performance parameters (see step 504 in FIG. 5). One such method to select a subset is to filter based on top signal strength or application throughput. For instance, the location data from the client devices reporting the top 10% of signal strength could be selected. Other such techniques are also contemplated, as discussed previously.

At step 604, utilizing the selected data, the server 106 (see FIG. 1) aggregates the location data from the client devices that reported the selected data. And, at step 606, the server 106 calculates a geographic location using the aggregated location data. The calculated geographic location can be determined using a variety of techniques, such as a geometric average of the aggregated location data or a centroid position determination of the aggregated location data. Next, at step 608, the server 106 assigns the calculated geographic location as the geographic location of the access point from which the performance parameters were collected.

Figure 7:
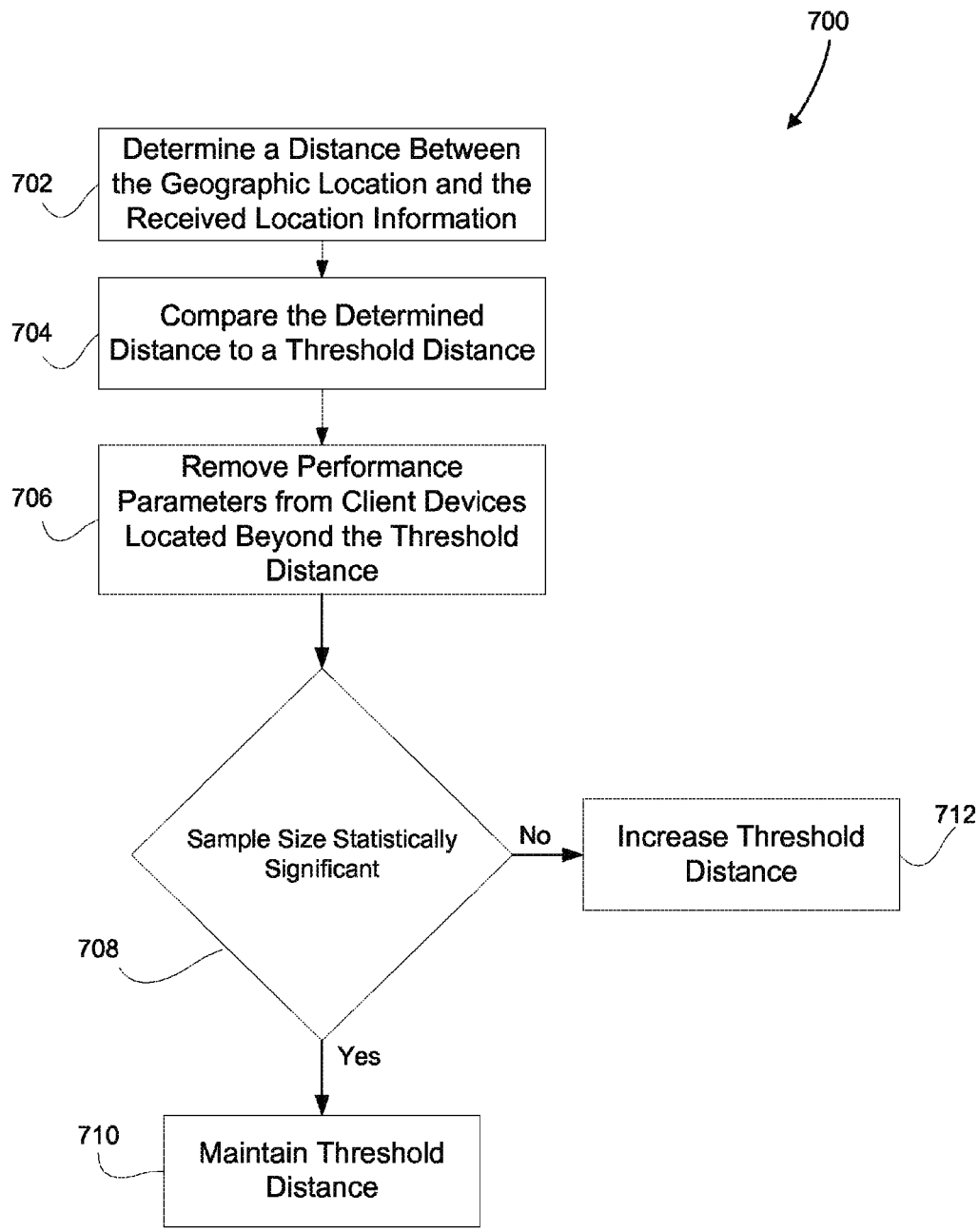
FIG. 7 is a flow diagram for removing network performance parameters, according to an example embodiment.

FIG. 7 illustrates with more detail the process of removing performance parameters received from client devices considered too far from the assigned geographic location of the access point of the data network, as performed at step 510 from FIG. 5. At step 702, the server 106 (see FIG. 1) determines a distance between the location reported by the client device, such as client device 108, and the assigned geographic location of the access point. At step 704, the distance determined at step 702 is compared to a threshold distance, and at step 706, any performance parameters received from client devices outside of the threshold distance are removed from the list built at step 506 from FIG. 5.

In certain embodiments, the threshold distance is a preset value; however, in other embodiments, the threshold is variable and adjustable based on the received performance parameters. One such embodiment is illustrated in FIG. 7, at steps 708-712. At step 708, the server 106 (see FIG. 1) checks whether the threshold comparison done at step 704 results in removing too many data points such that the data set is no longer statistically relevant. If the resulting sample size of performance parameter data is not large enough to be of statistical relevance, then the threshold is increased at step 712 in order to capture a greater number of samples. However, if it is determined, at step 708 that the sample size of performance parameter data is large enough, then, at step 710, the threshold is maintained. In certain embodiments, the threshold distance could be decreased such that less samples are collected so to minimize use of system resources.

Figure 8:
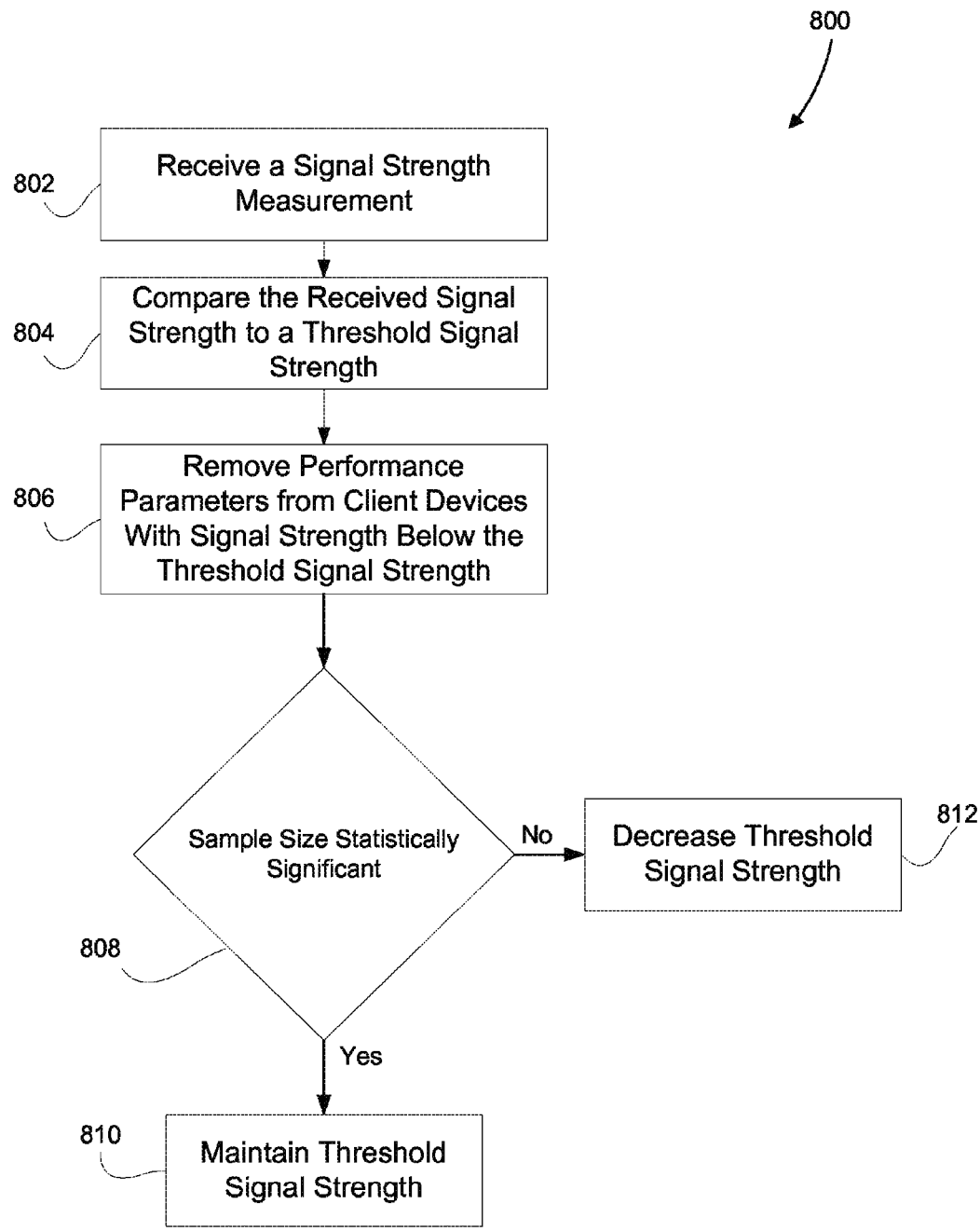
FIG. 8 is a flow diagram for removing network performance parameters, according to an example embodiment.

FIG. 8 illustrates with more detail the process of removing performance parameters received from client devices reporting a poor signal strength from an access point of the data network, as performed at step 510 from FIG. 5. At step 802, the server 106 (see FIG. 1) receives a signal strength measurement regarding an access point for a data network, the signal strength is received from a client device, such as client device 108. At step 804, the signal strength received at step 802 is compared to a threshold signal strength, and at step 806, any performance parameters received from client devices reporting signal strengths lower than the threshold signal strength are removed from the list built at step 506 from FIG. 5.

In certain embodiments, the threshold signal strength is a preset value; however, in other embodiments, the threshold is variable and adjustable based on the received performance parameters. One such embodiment is illustrated in FIG. 8, at steps 808-812. At step 808, the server 106 (see FIG. 1) checks whether the threshold comparison done at step 804 results in removing too many data points such that the data set is no longer statistically relevant. If the resulting sample size of performance parameter data is not large enough to be of statistical relevance, then the threshold signal strength is decreased at step 812 in order to capture a greater number of samples. However, if it is determined, at step 808 that the sample size of performance parameter data is large enough, then, at step 810, the threshold is maintained. In certain embodiments, the threshold distance could be increased such that less samples are collected so to minimize use of system resources.

Figure 9:
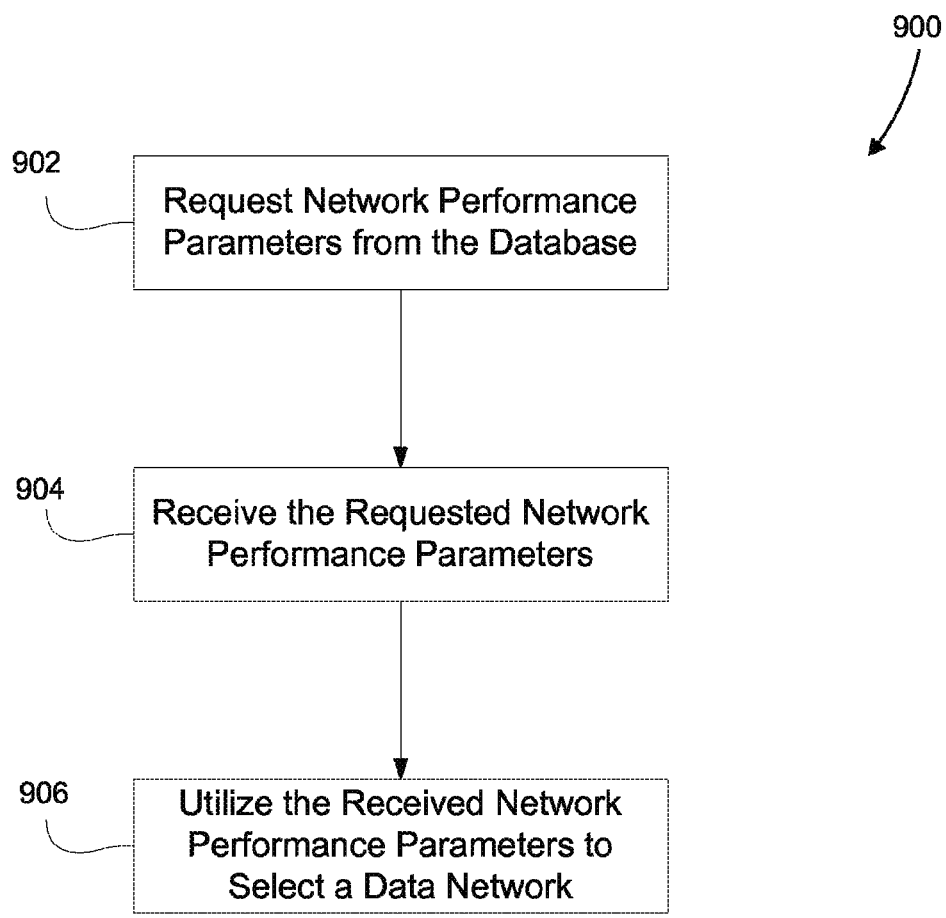
FIG. 9 is a flow diagram illustrating network selection by a client device from the the system illustrated in FIG. 1, according to an example embodiment.

FIG. 9 illustrates a flow chart of the steps a client device, such as client device 108 (see FIG. 1), performs when selecting a data network, such as data network 110, to connect. At step 902, client device 108 requests summarized performance parameters from the database 112 built at step 512 in FIG. 5 for a specific access point through which the client device 108 would like to connect. This request is generally accompanied by the key for the access point in question such that server 106 knows what specific summarized performance parameters are requested.

Additionally, in certain embodiments, the client device, such as client device 108 (see FIG. 1), will request the summarized performance parameters just prior to making a choice between which data network to join. However, in other embodiments, the client device 108 will know based on various factors such as user input or use history what general location the client device 108 will be located. In this situation, the client device 108 will request summarized performance parameters using a broader geographic area such as a zip code or city in advance of traveling to that area such that the summarized performance parameters for each data network within the specific area will be stored on the client device 108. In this embodiment, the client device then searches the stored data based on the key for the access point in order to determine performance parameters for available data networks.

At step 904, the client device 108 receives the requested data, and then at step 906, the client device 108 selects a data network from a set of available data networks to connect. The client device 108 utilizes the received performance parameters along with current network data performance parameters (such as current signal strength or distance between the client device 108 and the access point) measured at the time of connecting and user preference to determine which of the available data networks to connect.

Figure 10:
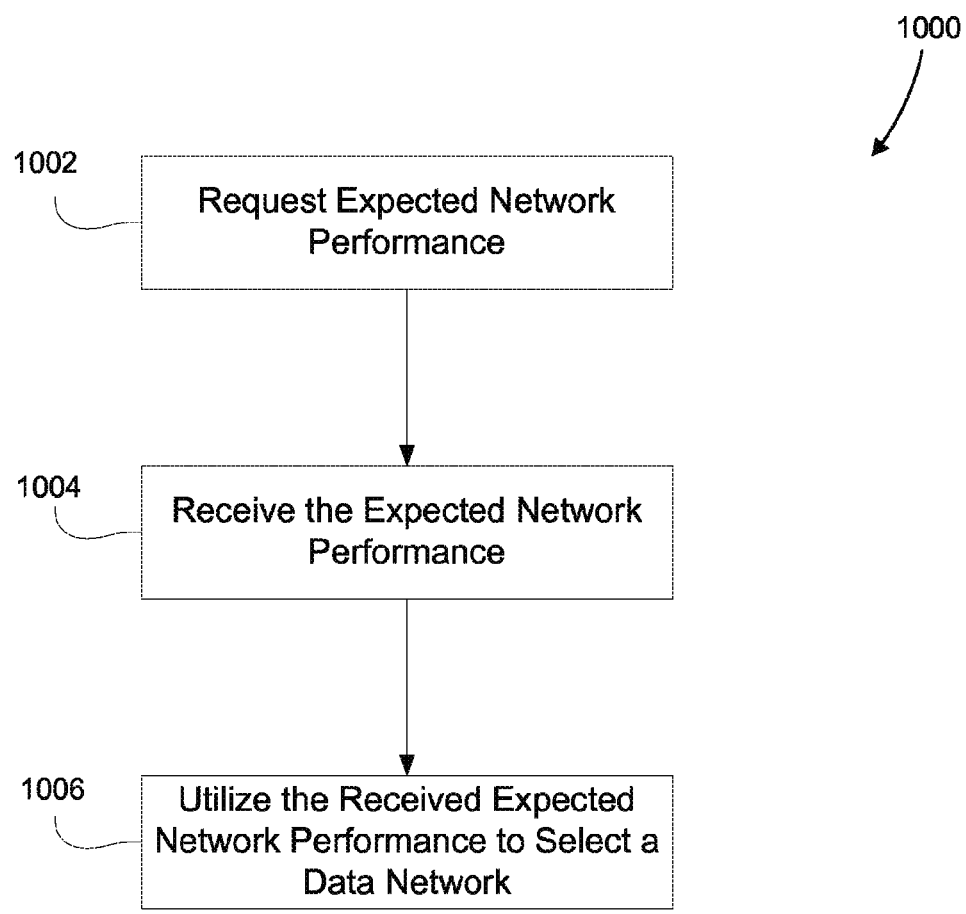
FIG. 10 is a flow diagram illustrating network selection by a client device from the system illustrated in FIG. 1, according to an example embodiment.

FIG. 10 illustrates a flow chart for a certain embodiment of the steps a client device, such as client device 108 (see FIG. 1), performs when selecting a data network, such as data network 110, to connect. At step 1002, client device 108 requests expected network performance based on current network performance and historical network performance from the database 112 built at step 512 in FIG. 5 for a specific access points for available data networks through which the client device 108 would like to connect. This request is generally accompanied by the key for each of the access points in question such that server 106 knows what specific access points are to be considered.

At step 1004, the client device 108 receives the expected performance for each access point, as determined by the server 106. The expected performance is based on instantaneous signal strength provided along with the key by the client devivce 108 and historical performance parameters based on the database 112 built at step 512. At step 1006, the client device 108 makes a decision on which data network to connect based on the expected performance received from the server 106.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a server.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for aiding selection of a data network based on access point location and historical performance parameters of the data network, the method comprising:
    receiving, at one or more processors, location information and network performance parameters from a plurality of client devices,
    the location information including a geographic location of each individual client device of the plurality of client devices when the individual client device detects available data networks and relating each individual client device of the plurality of client devices to the geographic location of the individual client device, and
    the network performance parameters are collected, by the individual client device, from the available data networks;
    aggregating the location information of the plurality of client devices and the network performance parameters from the available data networks such that the location information received from the individual client device of the plurality of client devices is associated with corresponding network performance parameters from the available data networks;
    determining, by the one or more processors, a geographic location of an access point for each of the available data networks based on the location information of the plurality of client devices;
    removing, for the access point for each of the available data networks, network performance parameters and location information for each of the available data networks based on one or more predefined criteria;
    building, by the one or more processors, a database containing the geographic location of the access point for each of the available data networks and the network performance parameters associated therewith from network performance parameters remaining after removing the network performance parameters and the location information for each of the available data networks;
    receiving a request for the geographic location and the network performance parameters from a requesting client device; and
    sharing the geographic information and the summarized network performance parameters with the requesting client device,
    wherein the determining the geographic location of the access point comprises:
    selecting a subset of the location information received from the individual client devices of the plurality of client devices based on the associated network performance parameters from the available data networks;
    aggregating the subset of the location information;
    calculating the geographic location of the access point for each of the available data networks based on the geographic locations of a subset of the individual client devices from the aggregated location information; and
    assigning the calculated geographic location to the access point for each of the available data networks,
    wherein the associated network performance parameters include a signal strength measurement of the access point for each of the available data networks, and
    wherein the selecting the subset of the location information received from the individual client device of the plurality of client devices is based on the signal strength measurement.

2. The method of claim 1, further comprising receiving a key associated with the received network performance parameters, the key uniquely identifying an individual access point of an individual data network.

3. The method of claim 2, wherein the step of receiving the request for the geographic information and the network performance parameters comprises receiving the key for the access point for each of the available data networks.

4. The method of claim 1, wherein the step of selecting comprises selecting all location information associated with a signal strength measurement in the top 10% of all of the signal strength measurements for the access point.

5. The method of claim 1, wherein the step of calculating the geographic location of the access point is performed by determining a geometric average of the geographic locations of the subset of the individual client devices from the aggregated location information.

6. The method of claim 1, wherein the step of calculating the geographic location of the access point is performed by determining a centroid position of the geographic locations of the subset of the individual client devices from the aggregated location information.

7. The method of claim 1, wherein the step of removing network performance parameters and location information comprises:
   determining a distance between the received location information and the determined geographic location of the access point;
   comparing the determined distance to a threshold distance; and
   removing performance parameters received from client devices where the determined distance is greater than the threshold distance.

8. The method of claim 7, wherein the threshold distance is a variable parameter and determining a value of the threshold distance comprises:
   determining if a sample size of the network performance parameters remaining after removing the network performance parameters and the location information considered too far away from the determined geographic location of the access point for each of the available data networks is large enough to be statistically significant;
   increasing the threshold distance if the sample size is determined to not be statistically significant; and
   maintaining the threshold distance if the sample size is determined to be statistically significant.

9. A system for aiding selection of a data network based on access point location and historical performance parameters of the data network,
   the system comprising:
   a plurality of client devices;
   a plurality of data networks, each individual data network of the plurality of data networks is associated with a key that uniquely identifies an access point of the individual data network; and
   a server communicatively coupled to the plurality of client devices, the server configured to:
   receive location information, network performance parameters and the key from the plurality of client devices,
   the location information including a geographic location of each individual client device of the plurality of client devices when the individual client device detects available data networks of the plurality of data networks and relating each individual client device of the plurality of client devices to the geographic location of the individual client device, and
   the network performance parameters are collected, by the individual client device, from the available data networks and the key is collected from the access point associated with the available data networks;
   aggregate received location information and network performance parameters from each of the plurality of client devices such that the aggregated location information and network performance parameters are organized based on the key;
   determine a geographic location of an access point for each data network of the plurality of data networks based on the received location information;
   remove, for each access point of the plurality of data networks, the received network performance parameters and the received location information for each data network of the plurality of data networks based on one or more predefined criteria;
   build a database of the geographic location of the access point for each data network of the plurality of data networks and network performance parameters remaining after removing the network performance parameters and the location information for each data network of the plurality of data networks;
   receiving a request for the geographic location and the network performance parameters from a requesting client device; and
   sharing the geographic information and the summarized network performance parameters with the requesting client device,
   wherein the server is further configured to determine the geographic location of the access point by:
   selecting a subset of the received location information based on the received network performance parameters from the available data networks,
   aggregating the subset of the received location information,
   calculating the geographic location of the access point for each data network of the plurality of data networks based on the geographic locations of a subset of the individual client devices from the aggregated location information, and
   assigning the calculated geographic location to the access point for each data network of the plurality of data networks,
   wherein the received network performance parameters include signal strength measurement of the access point for each data network of the plurality of data networks, and
   wherein selecting the subset of the location information received from the individual client device of the plurality of client devices is based on the signal strength measurement.

10. The system of claim 9, wherein the request for the geographic location and the network performance parameters for available data networks includes the key for each access point of each of the available data networks of the requesting client device.

11. The system of claim 10, wherein the requesting client device is configured to:
   receive the shared geographic information and the shared network performance parameters; and
   utilize the shared geographic information and the shared network performance parameters along with current network performance parameters measured by the requesting client device to determine which data network of the available data networks to connect.

12. The system of claim 9, wherein the server is further configured to determine which of the received network performance parameters and the received location information to remove by determining a distance between the received location information and the determined geographic location of the access point,
  comparing the determined distance to a threshold distance and removing performance parameters received from client devices where the determined distance is greater than the threshold distance.

13. A non-transitory computer readable storage device for aiding selection of a data network based on access point location and historical performance parameters of the data network,
  the computer readable storage device having computer executable instructions for performing the steps of:
  receiving location information and network performance parameters from a plurality of client devices,
  the location information including a geographic location of each individual client device of the plurality of client devices and relating each individual client device of the plurality of client devices to the geographic location of the individual client device when the individual client device detects available data networks, and
  the network performance parameters are collected, by the individual client device, from the available data networks;
  aggregating the location information of the plurality of client devices and the network performance parameters from the available data networks such that the location information received from the individual client device of the plurality of client devices is associated with corresponding network performance parameters from the available data networks;
  determining a geographic location of an access point for each of the available data networks based on the location information of the plurality of client devices;
  removing, for the access point for each of the available data networks, network performance parameters and location information for each of the available data networks based on one or more predefined criteria;
  building a database containing the geographic location of the access point for each of the available data networks and the network performance parameters associated therewith from network performance parameters remaining after removing the network performance parameters and the location information for each of the available data networks;
  receiving a request for the geographic location and the network performance parameters from a requesting client device; and
  sharing the geographic information and the summarized network performance parameters with the requesting client device,
  wherein the determining the geographic location of the access point comprises:
  selecting a subset of the location information received from the individual client devices of the plurality of client devices based on the associated network performance parameters from the available data networks;
  aggregating the subset of the location information;
  calculating the geographic location of the access point for each of the available data networks based on the geographic locations of a subset of the individual client devices from the aggregated location information; and
  assigning the calculated geographic location to the access point for each of the available data networks,
  wherein the received network performance parameters include a signal strength measurement of the access point for each data network of the available of data networks, and
  wherein selecting the subset of the location information received from the individual client device of the plurality of client devices is based on the signal strength measurement.

14. The non-transitory computer readable storage device of claim 13, wherein the step of removing network performance parameters and location information comprises:
  determining a distance between the received location information and the determined geographic location of the access point;
  comparing the determined distance to a threshold distance; and
  removing performance parameters received from client devices where the determined distance is greater than the threshold distance.

* * * * *